US006139747A

United States Patent
Rötzheim et al.

[11] Patent Number: 6,139,747
[45] Date of Patent: Oct. 31, 2000

[54] PROCESS FOR CLEANING UP WASTEWATERS FROM THE PREPARATION OF ALCOHOLS

[75] Inventors: Mariola Rötzheim, Mülheim; Wolfgang Zgorzelski, Oberhausen, both of Germany

[73] Assignee: Celanese GmbH, Germany

[21] Appl. No.: 09/212,823

[22] Filed: Dec. 16, 1998

[30] Foreign Application Priority Data

Dec. 24, 1997 [DE] Germany ............................ 197 57 904

[51] Int. Cl.$^7$ ...................................................... C02F 1/44
[52] U.S. Cl. ...................... 210/639; 210/805; 210/DIG. 5
[58] Field of Search ..................................... 210/639, 638, 210/806, DIG. 5; 568/881, 882, 883

[56] References Cited

U.S. PATENT DOCUMENTS 5,411,665   5/1995   Scraggs et al. .

FOREIGN PATENT DOCUMENTS 0631988   1/1995   European Pat. Off. .

*Primary Examiner*—W. L. Walker
*Assistant Examiner*—Terry K. Cecil
*Attorney, Agent, or Firm*—Bierman, Muserlian and Lucas

[57] ABSTRACT

A process for cleaning up the wastewaters which originate from the preparation of alcohols. The alcohol preparation includes an aldolization reaction followed by hydrogenation and then alcohol distillation. The resulting wastewaters include 3 wastewater fractions from respective steps in the alcohol preparation. The process for cleaning up these wastewaters include the steps of (a) combining two of the three fractions and adjusting the pH of the combination, (b) bringing at least one of the fractions into contact with a coalescing filter, and (c) extracting a mixture of all three fractions.

13 Claims, No Drawings

PROCESS FOR CLEANING UP WASTEWATERS FROM THE PREPARATION OF ALCOHOLS

FIELD OF THE INVENTION

A process for cleaning up wastewaters which are produced in the aldolization of identical or different aldehydes or ketones, or in the mixed aldolization of aldehydes and ketones, which is followed by hydrogenation.

STATE OF THE INVENTION

The term aldolization is used to include aldol addition and aldol condensation. The term aldol addition describes the base- or acid-catalyzed addition of activated methylene groups to the carbonyl groups of aldehydes or ketones, with the formation of β-hydroxy-carbonyl compounds. If the aldol addition is followed by elimination of water, which occurs readily and is usual when acid catalysts are used, this is called aldol condensation. The aldol condensation products are α,β-unsaturated carbonyl compounds.

The aldolization of two molecules of the same aldehyde or the same ketone is of particular importance. Reactions of this type are also utilized industrially. One example of the industrial application is the preparation of 2-ethylhexanol, the most important synthetic alcohol after the lower alcohols, methanol to butanol, by aldolization of n-butyraldehyde and subsequent hydrogenation. Phthalic esters of 2-ethylhexanol are very widely used as plasticizers for plastics.

For the preparation of alcohols with the incorporation of an aldolization step, aldehydes, as starting material, in the presence of aqueous, basic solutions, are first reacted in an aldol condensation to form an α,β-unsaturated aldehyde. In the preparation of the abovementioned 2-ethylhexanol, n-butyraldehyde is thus reacted to form 2-ethylhexenal under the action of aqueous sodium hydroxide solution, for example. The organic phase comprising the α,β-unsaturated aldehyde is then separated off from the catalyst-containing aqueous phase. After this, the organic phase is washed with water and the α,β-unsaturated aldehyde is hydrogenated to give the desired alcohol, in the case of 2-ethylhexenal to give 2-ethylhexanol. The crude alcohol thus obtained is then purified by a distillation and the residue of this distillation is subjected to further washing with water.

In the course of the aldolization and the subsequent hydrogenation, three different wastewater fractions are thus produced. These are
(1) the catalyst-containing aqueous phase from the aldolization reaction,
(2) the washwater from the purification of the α,β-unsaturated aldehyde produced in the aldolization and
(3) the washwater from the cleanup of the alcohol distillation residue.

These wastewater fractions comprise both water-soluble and water-insoluble, and thus emulsified, by-products, which can be formed in the individual process stages, in addition to unreacted starting materials and very small amounts of the products produced.

The unreacted starting materials are the starting aldehydes of the aldolization, such as n-butyraldehyde, and the products produced are the α,β-unsaturated aldehydes of the aldolization and the alcohols formed therefrom after hydrogenation. These products are present only in extremely small amounts in relation to the aldolization and hydrogenation by-products in the total amount of wastewater. In the case of the aldolization of n-butyraldehyde, 2-ethylhexenal, for example, is present at at most 0.2% by weight, based on the total amount of all organic compounds present in the wastewater, i.e. the sum of unreacted starting materials, by-products from aldolization and hydrogenation and products of aldolization and hydrogenation.

The by-products which are formed during the aldolization from the aldehyde used are primarily
branched isomers of the aldehyde used,
unbranched or branched alcohols having the same carbon number as the aldehyde,
unbranched or branched alcohols having one more carbon atom than the aldehyde used,
cyclic esters (lactones) having the same carbon number as the aldehyde,
carboxylic acids, present as salts, particularly alkali metal salts, having the same carbon number as the aldehyde and the corresponding free carboxylic acids,
aldehydes which are produced by hydrogenation of the α,β-unsaturated aldehyde from the aldolization reaction,
cyclic lactones and cyclic diols having 4 carbon atoms more than the desired alcohol from aldolization and following hydrogenation,
carboxylic esters from the desired alcohol and the corresponding carboxylic acid and
carboxylic esters from the desired alcohol and the carboxylic acid having the same number of carbon atoms as the starting aldehyde.

In addition, the following may be present in a very small amount as by-products
variously branched alcohols, aldehydes, ethers, lactones and acids having either one or two carbon atoms fewer or 1–4 carbon atoms more than the desired alcohol, from aldolization and following hydrogenation. In addition, the wastewater can also comprise hydrogenation products of by-products from the aldolization reaction and higher-boiling condensation products.

If 2-ethylhexanol is prepared by aldolization of n-butyraldehyde in the presence of sodium hydroxide solution followed by hydrogenation, the overall wastewater comprises, for example: n-butanal, i-butanal, n-butanol, i-butanol, 2-methylbutanol, n-butyric acid, sodium butyrate, 4-heptanol, 3-methyl-4-heptanone, 3-methyl-4-heptanol, 2-ethyl-4-methylpentanal, 2-ethyl-4-methylpentanol, 2-ethylhexanal, 2-ethylhexenal, 2-ethylhex-3-enol, 2-ethylhexanol, 2-ethylhexyl butyrate, 2-ethylhexyl 2-ethylhexanoate, 2-ethylhexanoic acid, 2-ethylhexane-1,3-diol, cyclic $C_{12}$-diol, cyclic $C_{12}$-lactone, cyclic saturated and unsaturated $C_{12}$ ethers, $C_{10}$ ethers, n-butyl 2-ethylhexyl ether and trimeric n-butanal.

The concentration of such organic compounds in aqueous media is customarily described by the COD value. The COD value (the abbreviation COD means chemical oxygen demand) is the amount of potassium dichromate, expressed as oxygen equivalent, which is consumed by the oxidizable constituents of one liter of water. The COD value is determined by a standardized procedure, which is described, for example, in Ullmanns Enzyklopädie der technischen Chemie [Ullmann's Encyclopedia of Industrial Chemistry], 4th edition (1981), volume 6, pages 376 ff.

Before the wastewater can be introduced into conventional treatment plants, into river courses or other receiving water bodies, its content of organic impurities must be markedly decreased to comply with the strict requirements of the legislature with respect to the maximum pollutant concentrations in wastewaters.

EP-A-0 631 988 discloses a process by which the concentration of organic impurities in the wastewaters from aldolizations and following hydrogenation reactions can be considerably lowered. In this process, the above-described three wastewater fractions are combined and adjusted to a pH of 0–6. An organic phase which separates out after this is removed, if appropriate, and the wastewater is then extracted with monohydric alcohols which contain 8 or more carbon atoms in the molecule and/or with hydrocarbons which contain more than 6 carbon atoms in the molecule.

The process is simple to carry out industrially and makes it possible to remove at least 90% of the organic compounds present in the combined wastewater. The extraction medium present after the extraction and loaded with the organic compounds and by-products is, under practical conditions, subjected to a distillation for recovery. The resulting distillation residue and a fraction taken off at the top of the distillation column comprise a major part of the organic by-products and are supplied to thermal utilization. The extraction medium recovered via a side takeoff is recirculated to the extraction process, with supplementation by fresh extraction medium.

An important aspect of the process of EP-A-0 631 988 is to adjust the generally alkaline wastewaters to a pH of 0–6, preferably 1–3. This protonates the carboxylic acids, for example, present as water-soluble alkali metal salts and thus converts them into the free carboxylic acids which free acids are water-insoluble substances. There is thus a development, to a greater or lesser extent, of an organic phase which is removed from the wastewater, which can already achieve a certain reduction in COD value. Setting said pH also causes the solubility of the extraction medium in water to be further reduced. This is because it has been found that the solubility of the extraction media in water is pH-dependent and is markedly lower in acidic media than in alkaline media. Therefore, in acidic solutions, they make only a small contribution to increasing the COD value.

Despite the reduction in pH followed by removal of the resulting organic phase, the wastewater in the process of EP-A-0 631 988, in addition to the dissolved water-soluble organic compounds, still comprises a certain amount of water-insoluble organic compounds which are emulsified in the wastewater. These substances can thus not be removed from the wastewater until the extraction step following the pH adjustment. Since higher-molecular-weight compounds and high-boiling condensation products are also removed by the extraction, high temperatures must be used in the distillation of the extraction medium loaded with these impurities, which in turn undesirably leads to increased formation of high-boiling condensation products in the distillation bottom phase. So that the distillation temperature does not need to be increased continuously, under practical conditions relatively large amounts of the distillation bottom phase are continuously taken off from the distillation reactor, which also conjointly removes 2-ethylhexanol each time, however and this is thus lost from the recirculation. This means that the 2-ethylhexanol recirculated downstream of the distillation must be constantly replenished by fresh 2-ethylhexanol.

OBJECTS OF THE INVENTION

The object of the invention is to provide an improved process for cleaning up of wastewaters from an aldolization and downstream hydrogenation which permits a more effective recovery of the extraction medium.

These and other objects and advantages of the invention will become obvious from the following detailed description.

THE INVENTION

The process of the invention for cleaning up wastewaters from the preparation of alcohols, which preparation comprises an aldolization reaction, a following hydrogenation and a concluding distillation of the alcohol, which wastewaters are comprised of three fractions, (1) the catalyst-containing aqueous phase from the aldolization reaction,
(2) the washwater from the purification of the α,β-unsaturated aldehyde produced in the aldolization and
(3) the washwater from the cleanup of the alcohol distillation residue, and the combined wastewater fractions having been extracted with monohydric alcohols of 8–16 carbon atoms in the molecule and/or with hydrocarbons of 6–12 carbon atoms in the molecule, comprising (a) upstream of the extraction, first combining at least two of the three wastewater fractions and adjusting them to a pH of 0 to 6 and optionally removing the organic phase forming during this and
(b) in the course of the process, bringing at least one of the three wastewater fractions individually and/or collectively into contact with a coalescing filter.

The wastewaters from the preparation of alcohols used in the process of the invention, which preparation comprises an aldolization reaction, a following hydrogenation and a concluding distillation of the alcohol, are the three wastewater fractions (1), (2) and (3), which can comprise the water-soluble and water-insoluble organic compounds which have already been specified in detail.

The coalescing filters used in the process of the invention are liquid/liquid phase separators for very fine demisting, in which the physical action of coalescence is exploited in specially constructed cylindrical fiber bed elements. Coalescing filters of this type are known in the prior art (see, for example, Chemie-Technik, vol. 18 (1989) pp. 14–21). They consist of, for example, plastic fibers of polypropylene or polytetrafluoroethylene, or of glass fibers or metal fibers. A driving differential pressure of approximately 0.1 bar is necessary for flow through the fiber bed.

When flow passes through the fiber bed of the coalescing filter, the water-insoluble organic compounds which are finely dispersed in the wastewater combine, or they are retained by an organic separating layer already present on the fiber bed and form a wetting film. This wetting film migrates with the driving wastewater stream to the exit of the fiber bed, where large droplets of the organic phase then separate off at intervals and separate out due to gravity alone.

This organic phase can in turn be separated off from the wastewater which results in the fact that the wastewater entering the following extraction has a lower COD value. Thus, only a smaller amount of organic compounds must be removed from the wastewater in the extraction. The extraction medium leaving the extraction is therefore only loaded with a smaller amount of organic compounds, and the temperatures required in the distillation reactor for recovering the extraction medium are correspondingly lower. This markedly decreases the formation of further high-boiling by-products in the work-up of the used extraction medium by distillation. Correspondingly, only small amounts of the distillation bottom phase need to be continuously removed, as a result of which the loss of the extraction medium during work-up is markedly lower than in the case of the process according to EP-A-631 988, when no coalescing filter is used. This is accompanied by the advantage that after the work-up of the extraction medium by distillation, only markedly smaller amounts of fresh extraction medium need to be added.

The intermediate connection of a coalescing filter provides, in the process of the invention, a design for improving wastewater cleanup which is associated with many-sided beneficial effects. A further advantage of the process of the invention is based on the fact that the coalescing filters are suitable for a continuous mode of operation and the overall process for cleaning up wastewaters can also be carried out continuously subsequent to the aldolization and hydrogenation reactions.

Various embodiments have proved particularly useful for the process of the invention. The embodiment A1 comprises first combining the wastewater fractions (1) and (3) with one another according to step (a), adjusting them to a pH of 0 to 6, preferably 1 to 3, and optionally freeing them from the organic phase which forms and then combining the remaining wastewater with the wastewater fraction (2), conducting them collectively through a coalescing filter and then subjecting them to the extraction.

An embodiment A2 comprises again first combining the wastewater fractions (1) and (3) with one another according to step (a), adjusting them to a pH of 0 to 6, preferably 1 to 3, and optionally freeing them from the organic phase which forms, and then combining the remaining wastewater with the wastewater fraction (2) which has already been conducted through a coalescing filter and feeding the mixture to the extraction.

In the embodiment A3, the wastewater fractions (1) and (3) are first combined with one another according to step (a), adjusted to a pH of 0 to 6, preferably 1 to 3, optionally freeing them from the organic phase which forms and passing them through a coalescing filter. The remaining wastewater is then combined with the wastewater fraction (2) which has likewise already been passed through a coalescing filter and the mixture is fed to the extraction.

A further embodiment A4 is distinguished by the fact that all three wastewater fractions (1), (2) and (3) are first combined, adjusted to the pH of 0 to 6, preferably 1 to 3, and optionally freed from the organic phase which forms, and are then collectively conducted through a coalescing filter and subjected to the extraction.

To adjust the pH of the wastewater, inorganic acids such as hydrochloric acid, sulfuric acid, nitric acid or phosphoric acid are used with preference being given to sulfuric acid.

Since the deposition of solid particles in the fiber bed of the coalescing filter can lead to an impairment of the separation efficiency, it can be expedient to connect, upstream of the coalescing filter, a suitable filter stage for removing solid particles.

As extraction medium in the process of the invention, use is made of alcohols of 8 to 16 carbon atoms in the molecule. They can be unbranched or branched, saturated or unsaturated and it is not necessary to use pure alcohols. Suitable extraction media are also mixtures of isomeric alcohols or of alcohols of different molecular size. Those which have proved to be useful are 2-ethylhexanol, 3,5,5-trimethylhexanol, isooctanol, nonanols, decanols and isodecanols, and the mixtures of the isomeric octanols, nonanols and decanols.

In addition to the alcohols, hydrocarbons of 6 to 12 carbon atoms in the molecule can also be used as extraction medium. The hydrocarbons can also be unbranched or branched, saturated or unsaturated. Those which have proved particularly useful are mixtures of different hydrocarbons which are produced as low-boiling fractions in the distillation of petroleum, particularly light fuel oil.

Apart from alcohol mixtures or mixtures of different hydrocarbons, mixtures of alcohols and hydrocarbons can also be used for extracting the organic compounds from the wastewater. The mixing ratio can extend over a broad range and is primarily restricted by the miscibility of the components. The alcohols and/or hydrocarbons used in the invention have proved to be excellent extraction media for the organic substances usually present in the specified wastewaters. It is also of importance that they are dissolved only to a very slight extent by the water phase.

The organic compounds are extracted from the wastewaters by the process of the invention in apparatuses customary for solvent extraction. Those which have proved to be useful are extractors which are constructed as single-stage or multiple-stage as extraction batteries of a plurality of mixer-settler pairs connected one after the other. Likewise, use can be made of extraction columns having static internals, such as packed columns, or having moving internals, such as stirred columns, extraction medium and carrier liquid being conducted concurrently or, preferably, countercurrently.

The extraction medium may be regenerated in a simple manner by distillation and can therefore be used repeatedly. The distillation residue and the overhead takeoff from the distillation column comprise the organic compounds to be removed and are fed to thermal utilization, while the extraction medium is recovered via a column side takeoff and recycled to the extraction process.

The novel process is suitable for working up wastewaters of the aldolization reaction and downstream hydrogenation, independently of the aldolization process employed and the starting materials used. The aldolization can therefore have been carried out, for example, with alkali metal hydroxide, alkali metal carbonate or amines as catalysts and with aldehydes or ketones.

Various modifications of the process of the invention may be made without departing from the spirit or scope thereof and it is to be understood that the invention is intended to be limited only as defined in the appended claims.

What we claim is:

1. A process for cleaning up wastewaters from the preparation of alcohols, said preparation comprising an aldolization reaction and a following hydrogenation, said wastewaters being comprised of the following three fractions:

(1) the catalyst-containing aqueous phase from the aldolization reaction, (2) the washwater from the purification of the $\alpha,\beta$-unsaturated aldehyde produced in the aldolization reaction and (3) the washwater from the cleanup of the alcohol distillation residue, said process comprising the following steps:

(a) combining two of the three wastewater fractions and adjusting the combination to a pH of 0–6, (b) bringing at least one of the three wastewater fractions into contact with a coalescing filter, and (c) extracting a mixture of the three wastewater fractions with monohydric alcohols of 8 to 16 carbon atoms in the molecule and/or with hydrocarbons of 6 to 12 carbon atoms in the molecule.

2. The process of claim 1, wherein the wastewater fractions (1) and (3) are first combined with one another and adjusted to a pH of 0 to 6 according to step (a) and then combined with wastewater fraction (2) to form a mixture, said mixture is conducted through a coalescing filter and is then subjected to the extraction.

3. The process of claim 2, wherein the pH is adjusted to 1 to 3.

4. The process of claim 2, wherein the organic phase, formed during the adjustment of the pH, is removed.

5. The process of claim 1, wherein the wastewater fractions (1) and (3) are first combined with one another and adjusted to a pH of 0 to 6 according to step (a) and then combined with wastewater fraction (2), which has already passed through the coalescing filter, to form a mixture, said mixture is then subjected to the extraction.

6. The process of claim 5, wherein the pH is adjusted to 1 to 3.

7. The process of claim 5, wherein the organic phase, formed during the adjustment of the pH, is removed.

8. The process of claim 1, wherein the wastewater fractions (1) and (3) are first combined with one another and adjusted to a pH of 0 to 6 according to step (a), conducted through a coalescing filter, and then combined with wastewater fraction (2), which has already passed through a coalescing filter, to form a mixture, said mixture is then subjected to the extraction.

9. The process of claim 8, wherein the pH is adjusted to 1 to 3.

10. The process of claim 8, wherein the organic phase, formed during the adjustment of the pH, is removed.

11. The process of claim 1, wherein the pH is adjusted by hydrochloric acid, sulfuric acid, nitric acid or phosphoric acid.

12. The process of claim 11, wherein the pH is adjusted to 1 to 3.

13. The process of claim 1, wherein the organic phase, formed during the adjustment of the pH, is removed.

* * * * *